United States Patent
Kross et al.

(10) Patent No.: US 11,694,283 B2
(45) Date of Patent: Jul. 4, 2023

(54) METHOD FOR PRODUCING A PRODUCT BY WAY OF A DRINKS PREPARATION MACHINE, A SYSTEM FOR CARRYING OUT THE METHOD AND A MACHINE BACKEND FOR A DRINKS PREPARATION MACHINE

(71) Applicant: Tchibo GmbH, Hamburg (DE)

(72) Inventors: Friedrich Kross, Greifensee (CH); Dominik Franke, Brüttisellen (CH)

(73) Assignee: TCHIBO GMBH, Hamburg (DE)

( * ) Notice: Subject to any disclaimer, the term of this patent is extended or adjusted under 35 U.S.C. 154(b) by 363 days.

(21) Appl. No.: 16/762,220

(22) PCT Filed: Nov. 6, 2018

(86) PCT No.: PCT/EP2018/080232
§ 371 (c)(1),
(2) Date: May 7, 2020

(87) PCT Pub. No.: WO2019/091941
PCT Pub. Date: May 16, 2019

(65) Prior Publication Data
US 2020/0334941 A1 Oct. 22, 2020

(30) Foreign Application Priority Data
Nov. 9, 2017 (EP) .................... 17200736

(51) Int. Cl.
*G06Q 30/00* (2023.01)
*G06Q 50/12* (2012.01)
(Continued)

(52) U.S. Cl.
CPC ............. *G06Q 50/12* (2013.01); *G06F 3/167* (2013.01); *G07F 13/065* (2013.01)

(58) Field of Classification Search
CPC ........ G07F 13/065; G06F 3/167; G06Q 50/12
See application file for complete search history.

(56) References Cited

U.S. PATENT DOCUMENTS 6,493,641 B1 * 12/2002 Singh ..................... A23K 50/40
426/805
7,899,713 B2 * 3/2011 Rothschild ......... G06Q 30/0633
705/26.5
(Continued)

FOREIGN PATENT DOCUMENTS

DE 10 2006 032 707 1/2008
DE 10 2012 109 982 4/2014
(Continued)

OTHER PUBLICATIONS

"Whats All the Fizz About? A Teaching Case Study on the Use of Coca-Cola Freestyle Machines in Quick-Service Restaurants," by Andrew A. Tiger, William Nance, Caitlin Roach, and Brooke Glover Emery, Journal of Marketing Development and Competitiveness, 11.2: 17-26, Sep. 2017 (Year: 2017).*

*Primary Examiner* — Anne M Georgalas
(74) *Attorney, Agent, or Firm* — Rankin, Hill & Clark LLP

(57) ABSTRACT

A method for producing a product by way of a drinks preparation machine, including the steps of, by way of a machine backend for a drinks preparation machine, receiving a backend order. The backend order includes an identifier for the identification of a preparation prescript, as well as a configuration identifier. A preparation prescript is determined by way of determining, in the case that the identifier is the same as an individual identifier, a preparation prescript that in one of several user profiles is assigned to the individual identifier. The user profile is determined in accordance with the configuration identifier. By way of the machine backend, a machine order is generated to the drinks preparation machine, wherein the machine order specifies
(Continued)

the preparation prescript. By way of the drinks preparation machine, the product is produced in accordance with the preparation prescript.

8 Claims, 1 Drawing Sheet

(51) Int. Cl.
*G06F 3/16* (2006.01)
*G07F 13/06* (2006.01)

(56) References Cited

U.S. PATENT DOCUMENTS

| | | | | |
|---|---|---|---|---|
| 8,162,176 B2* | 4/2012 | Rudick | | B67D 1/0888 |
| | | | | 222/145.5 |
| 8,340,815 B2* | 12/2012 | Peters | | G06Q 50/06 |
| | | | | 700/239 |
| 8,744,618 B2* | 6/2014 | Peters | | B67D 1/0015 |
| | | | | 700/242 |
| 9,499,385 B1* | 11/2016 | Studor | | G07F 13/065 |
| 10,043,226 B2* | 8/2018 | Craparo | | G06Q 20/18 |
| 10,934,149 B2* | 3/2021 | Lim | | G06F 3/04817 |
| 2009/0094033 A1 | 4/2009 | Mozer et al. | | |
| 2009/0258331 A1* | 10/2009 | Do | | G09B 21/003 |
| | | | | 434/127 |
| 2010/0030355 A1* | 2/2010 | Insolia | | G06Q 30/0603 |
| | | | | 700/285 |
| 2012/0245732 A1* | 9/2012 | Yoakim | | G07F 9/026 |
| | | | | 709/224 |
| 2015/0144653 A1* | 5/2015 | Kline | | G07F 9/001 |
| | | | | 222/23 |
| 2016/0055599 A1 | 2/2016 | Illy et al. | | |
| 2017/0024790 A1* | 1/2017 | Maggio | | G07F 17/3258 |
| 2017/0099980 A1 | 4/2017 | Haidar et al. | | |
| 2018/0325307 A1* | 11/2018 | Stasch | | A47J 31/521 |

FOREIGN PATENT DOCUMENTS

| | | |
|---|---|---|
| EP | 3 167 775 | 5/2017 |
| EP | 3 168 815 | 5/2017 |
| JP | 2003-506107 A | 2/2003 |
| JP | 2006-330576 A | 12/2006 |
| JP | 2016-14967 A | 1/2016 |
| RU | 2 561 848 | 9/2015 |
| WO | 01/12038 | 2/2001 |
| WO | 2010/010587 | 1/2010 |

\* cited by examiner

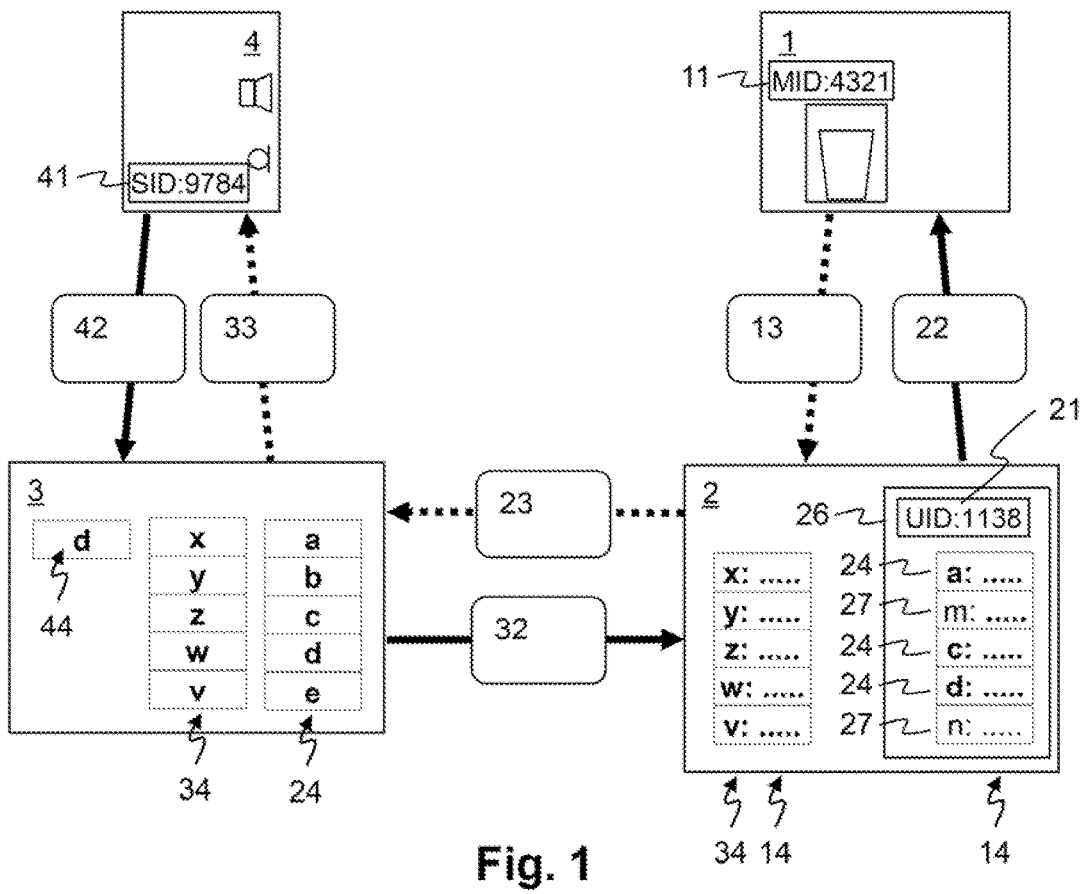
Fig. 1
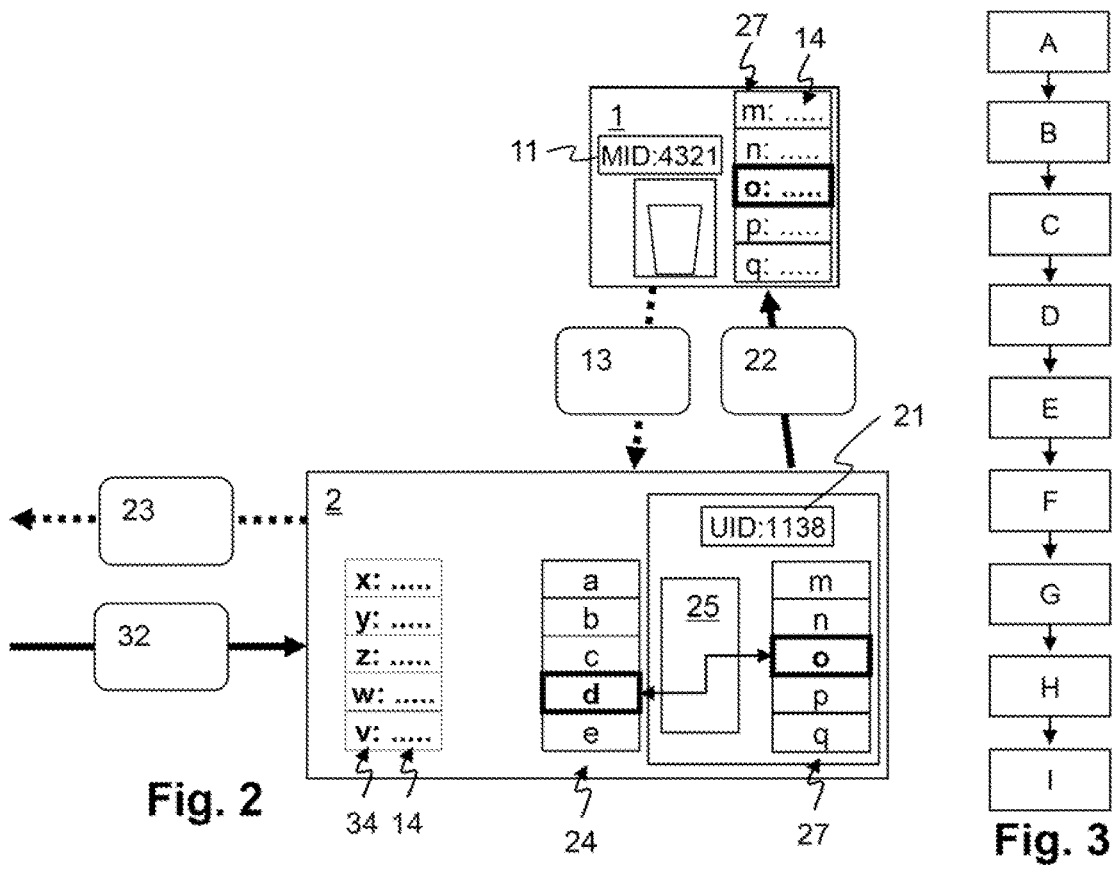
Fig. 2
Fig. 3

METHOD FOR PRODUCING A PRODUCT BY WAY OF A DRINKS PREPARATION MACHINE, A SYSTEM FOR CARRYING OUT THE METHOD AND A MACHINE BACKEND FOR A DRINKS PREPARATION MACHINE

BACKGROUND OF THE INVENTION

Field of the Invention

The invention relates to drinks preparation machines for preparing drinks or the like, for example from a portion package with a portion packaging (for example, capsule) and with an extraction material (for example, coffee) that is contained in the portion packaging. In particular, it relates to a method for producing a product by way of a drinks preparation machine, to a system for carrying out the method and a machine backend for a drinks preparation machine.

Description of Related Art

Drinks preparation machines for preparing drinks or the like from an extraction material which is present in a portion package are known for example as coffee machines or espresso machines. In many corresponding systems, the portion packaging is designed as capsules, in which the extraction material is sealed, for example in an airtight manner. For extraction, the capsule is placed in a capsule receiver and is pierced, for example at two sides that are opposite to one another. An extraction fluid—generally hot water—is then introduced at the first side. The extraction product is discharged from the capsule at the second side. This takes place in a so-called brewing module.

Apart from a brewing module, one or more further units can be present for delivering and adding a further a drinks component such as, for example, milk. The drinks preparation machine can therefore create a drink or expressed generally a total product from two part-products.

The European patent application No. 15 194 735 describes a method for the operation of a drinks preparation machine for creating a product from several part-products, wherein quantity shares of the part-products can be adapted by a user on a graphic display of the quantity shares.

The European patent application No. 15 194 667 describes a method for the operation of a drinks preparation machines amid the use of preparation parameters, which are determined on the basis of a portion code of a portion package. Herein, individual preparation parameters can be adapted by a user.

Amongst other things, the option of a communication of the drinks preparation machine with an operating device is described in the aforementioned patent applications, said operating device being able to be mobile and portable, for example a mobile telephone or a smartphone. By way of the operating device, preparation prescripts or recipes can be transferred (transmitted) to the drinks preparation machine, or preparation prescripts that are stored in the drinks preparation machine can be modified. A preparation prescript can specify, for example, quantity ratios of part-products and/or production parameters such as brewing times and brewing temperatures, according to the individual preferences of users. Individualised preparation prescripts can therefore be stored in a drinks preparation machine. Such individualised preparation prescripts can also include their own, individualised name, for example "Karl's coffee" or "Morgan's coffee".

Preparation prescripts can be selected on the drinks preparation machine and/or on the operating device, depending on how a user interface is designed. In a subsequent step, the production of the product can be activated in accordance with the selected preparation prescript. This too can be effected on the drinks preparation machine and/or on the operating device or on both.

As an alternative or supplementary to what has been described above, it is conceivable to carry out a selection of a preparation prescript via a voice-controlled system. Herein, one can fall back on an existing infrastructure for voice recognition and command processing. Such an existing system is for example the device "Amazon Echo" in combination with Alexa Voice Services in the Amazon-Cloud. Other known systems are "Google Home" of Google and "Siri" of Apple.

Apart from standardised functions, Amazon provides an infrastructure for functions for third-party providers, so-called skills. Herewith, voice commands to the Amazon Echo device which relate to these functions of the third-party providers can be recognised and led further to servers of the third-party provider. Similarly, responses from the server of the third-party provider can be processed and responses to be user that correspond to the situation can be generated from this and outputted in spoken form by Amazon Echo.

With the system, a name of a preparation prescript, hereinafter also called recipe name for short, can be recognised and transferred to a drinks preparation machine as a selected preparation prescript, as part of a command for preparing a drink.

However, in combination with the described individualised preparation prescripts, there results the problem of people being able to arbitrarily name, write and pronounce their recipes. However, Alexa is limited inasmuch as this is concerned. For instance, Alexa, e.g., given the word "Morgan's coffee" accordingly recognises "Morgans coffee", "Morgan's coffee", "mornings coffee", "Morgan's Café", "morning coffee", "Morgens coffee". An assignment of a voice input to the actual recipe name is very difficult when confronted with such different possible interpretations.

Furthermore, there is no solution for third-party providers, with which solution individual names of preparation prescripts can be stored. It is only possible to store a quantity of recipe names for a skill, for example the skill "coffee machine control of the manufacturer Qbo", said names being globally the same for all users of the skill. This would mean that the voice recognition system would have to have the knowledge of all individual recipe names of all machines and of all users for all machines of this manufacturer—but most of them could not be implemented at all, since they are stored and desired on only one machine.

WO 01/12038 describes a method for "delayed filtering" for creating individualised variants of fresh coffee on the basis of an extract which has been brewed for some time-maximally 48 hours. This extract is filtered on the basis of user preferences. The user preferences are processed with a "customisation director". This can be realised in a server outside a drinks preparation machine. A recipe is generated from the user preferences in the customisation director. Herein, one can use stored data which is linked to the identity of the user. However, an identifier which identifies the preparation prescript is not processed.

SUMMARY OF THE INVENTION

A possible object of the invention is to permit a user to control the production of drinks according to individualised recipes (or preparation prescripts) by way of voice input, despite an infrastructure for voice recognition which is applied for this not permitting individualised voice commands.

It is a possible object of the invention to permit a user to produce drinks according to individualised recipes (or preparation prescripts) with a relatively high reliability of the voice (speech) recognition.

At least one of these objects is achieved by a method for producing a product by way of a drinks preparation machine, a system for carrying out the method and a machine backend for a drinks preparation machine.

It is therefore an object of the invention to provide a method for producing a product by way of a drinks preparation machine, a system for carrying out the method and a machine backend for a drinks preparation machine of the initially mentioned type, which overcome the aforementioned disadvantages.

The method for producing a product by way of a drinks preparation machine includes the following steps:

by way of a machine backend for a drinks preparation machine, receiving a backend order, wherein the backend order includes an identifier for the identification of a preparation prescript, as well as a configuration identifier;

determining a preparation prescript by way of determining, in the case that the identifier is the same as an individual identifier, a preparation prescript which in one of several user profiles is assigned to the individual identifier, wherein the user profile is determined in accordance with the configuration identifier;

by way of the machine backend, generating a machine order to the drinks preparation machine, wherein the machine order specifies the preparation prescript;

by way of the drinks preparation machine, producing the product in accordance with the preparation prescript.

Herewith, it is possible for a voice recognition backend which produces the backend order to only need to identify a relatively small quantity of identifiers. These identifiers are common to all users of drinks preparation machines that are activated with the method and therefore also to all individual configurations of voice recognition devices and users and drinks preparation machines. This quantity of identifiers can include, for example, twenty or less, or forty or less or sixty or less identifiers.

Due to the fact that a group of the identifiers are individual identifiers, for which individual preparation prescripts can each be stored specifically for a user, the production of individual products for the user is possible even though only standardised individual identifiers are processed by the voice interface.

Due to the fact that only a limited quantity of identifiers and of associated voice commands is present, an infrastructure which can only process such a limited quantity of voice commands can be used.

Due to the fact that only a limited quantity of identifiers and of associated voice commands is present, a reliability of the voice recognition can be increased compared to a situation in which a large number of voice commands needs to be recognised and differentiated from one another. Further, given the selection of the limited quantity of voice commands, one can make sure that these can be well differentiated from one another, thus do not sound similar.

The individualisation of the orders is effected in the machine backend by way of it being determined by way of an identifier as to whether the order includes a generic identifier or an individual identifier. If an individual identifier is present, then the preparation prescript that is determined therefrom is dependent on a configuration identifier.

The configuration identifier identifies a certain configuration of a specific voice interface, of at least one drinks preparation machine and of a user profile, thus their assignment to one another. This assignment can be described as configuration information. The configuration information assigns an interface identifier of the voice interface to a user identifier and/or to at least one machine identifier.

The configuration identifier, depending on the embodiment, can hence be the same as the interface identifier or the user identifier or the machine identifier.

A user can use several drinks preparation machines. Accordingly, several machine identifiers can be assigned to a user identifier. Several drinks preparation machines can also be assigned to a voice interface. Accordingly, several machine identifiers can be assigned to an interface identifier in the configuration information.

On the basis of the configuration information it can be determined, starting from the voice interface from which the order originates, for which user and/or which drinks preparation machine the order is valid. This determining can be effected in the voice recognition backend or in the machine backend, depending on the embodiment.

An acquisition of configuration information, thus of the assignment between the voice interface and the user and/or drinks preparation machine can be effected when a user logs in at the voice interface, wherein an interface identifier of the voice interface can be assigned to a user identifier and/or to a machine identifier.

The use of a user identifier or of an associated user profile renders it possible for a user to be able to nurture and use individual preparation prescripts independently of the drinks preparation machine which he uses. The individual preparation prescripts are then advantageously stored in the machine backend and assigned to the user identifier, and likewise the individual identifiers and optionally also assignment prescripts (see below).

The step of the production of the product by way of the drinks preparation machine can include part-steps for confirming the correctness of the selected preparation prescript and/or for examining whether the production is possible, and/or for the separate activating of the production by way of a further operating step by the user. Herein, this operating step can be an interaction with the drinks preparation machine, the voice interface or an operating device which is separate and which communicates with the drinks preparation machine, for example a smartphone.

In embodiments, the step for determining a preparation prescript includes the step:

determining, in the case that the identifier is the same as a generic identifier, a preparation prescript which is assigned to this, wherein the assignment is independent of a user profile.

This can be effected on the basis of a list, which assigns a preparation prescript to a generic identifier in each case. Such a list or generally the assignment, which is realised herewith, is typically stored in the machine backend. In other embodiments, it is stored in the drinks preparation machine. The assignment is thus generally independent of configuration information as described above, or of a user or a user profile, and can also be independent of the interface identifier and/or of the machine identifier.

In embodiments, if no preparation prescript is assigned to the individual identifier (thus no preparation prescript can be determined on the basis of the individual identifier), then the machine backend transfers a backend feedback to a voice recognition backend for the output of an error message by a voice interface.

Herewith, it is possible to display to the user the fact that the configuration of the system is incomplete with regard to the preparation prescript for the received individual identifier.

In embodiments, a preparation prescript is assigned to an individual identifier in a direct manner, and individual identifiers and assigned preparation prescripts are stored in the machine backend.

Herewith, it is possible to manage and use individual preparation prescripts of a user independently of a particular drinks preparation machine.

In embodiments, several user profiles are stored in the machine backend, and each user profile includes a user-specific list of the individual identifiers and their assignment to user-specific preparation prescripts.

Herewith, it is possible to manage and use individual preparation prescripts of several users. Herein, the selection of the user profile can be effected on the basis of a configuration identifier, thus a user identifier or an interface identifier or a machine identifier.

In embodiments, the machine order specifies the preparation prescript in accordance with the individual identifier or the generic identifier by way of the machine order including this preparation prescript.

Hence, the preparation prescript is transferred to the drinks preparation machine and is used in the drinks preparation machine for production. For determining the preparation prescript, a stored list of preparation prescripts and their assignment to individual identifiers or to generic identifiers is present in the machine backend.

In embodiments, the machine order specifies the preparation prescript in accordance with the individual identifier or the generic identifier by way of the machine order including the individual identifier or the generic identifier.

The individual identifier is thus transferred to the drinks preparation machine, and in the drinks preparation machine and on the basis of a stored list of preparation prescripts it is that one that corresponds to the individual identifier or to the generic identifier that is selected and used for production. Herein, configuration information is implicitly contained since the specific drinks preparation machine has been determined on the basis of this information and itself only has knowledge of a set of individual identifiers.

In embodiments, the preparation prescripts are each assigned to an individual identifier in an indirect manner via an assignment prescript and a personal identifier.

In embodiments, a preparation prescript is assigned to an individual identifier in an indirect manner via an assignment prescript and a personal identifier, and the assignment prescript is determined on the basis of configuration information which includes an assignment of the assignment prescript to a configuration identifier, in particular in the form of one or more of the following information:

an assignment of the assignment prescript to a machine identifier;
an assignment of the assignment prescript to an interface identifier;
an assignment of the assignment prescript to a user identifier.

Starting from an individual identifier, an assigned personal identifier is determined via the assignment prescript, and in turn, starting from this identifier, an assigned preparation prescript.

Generally, it is the case that such assignments in the system, in particular in the machine backend, can be represented in a direct manner, or indirectly via other identifiers. In both variants (direct or indirect), the configuration information permits the unambiguous determining of one of several assignment prescripts on the basis of a given machine identifier, interface identifier, user identifier etc.

In embodiments, several assignment prescripts are therefore stored in the machine backend. The assignment prescript that is used in a certain order is determined in the machine backend on the basis of the configuration information.

In embodiments, the method includes the step:
by way of a voice interface and a voice recognition backend, acquiring a voice input and generating, in accordance with the voice input, the backend order to the machine backend for the drinks preparation machine, wherein the backend order includes the identifier for the identification of a preparation prescript.

The voice interface is typically a device with a microphone, with a loudspeaker and with a data processing unit, the data processing unit being configured to detect acoustic signals with the microphone, digitalise them and transfer them as an order voice file to a voice recognition backend, and to receive feedback voice files from the voice recognition backend and to output them with the loudspeaker as acoustic signals.

The voice recognition backend can process the order voice file and determine whether this includes an order for producing a product way of a drinks preparation machine, and, if this is the case, determine the identifier.

The generation of an order (backend order or machine order) includes the transfer to a receiver of the order. The transfer can be effected by way of a push method or a pull method.

In embodiments, a transfer of the machine order to the drinks preparation machine is effected by way of a pull method by way of the drinks preparation machine enquiring at the machine backend as to whether a machine order is present, and given the presence of a machine order, activating its transfer to the drinks preparation machine.

In embodiments, the method includes the additional steps:
by way of the drinks preparation machine, generating a machine feedback to the machine backend;
by way of the machine backend, generating a corresponding backend feedback to the voice interface;
by way of the voice interface, outputting a voice message in accordance with the backend feedback.

The machine feedback can include for example information of the following type:
confirmation that the selection of the preparation prescript has been received by the drinks preparation machine;
confirmation of the selection of the preparation prescript together a name of the preparation prescript;
error messages concerning the state of the drinks preparation machine, for example if water is absent, if no portion package is present, if a portion package which does not match the preparation prescript is present.

The system includes a drinks preparation machine and a machine backend, and is configured for carrying out the method.

The machine backend for a drinks preparation machine is configured for carrying out the following steps
receiving a backend order, wherein the backend order includes an identifier for the identification of a preparation prescript, as well as a configuration identifier;

determining a preparation prescript by way of determining,
in the case that the identifier is the same as an individual identifier, a preparation prescript which in a user profile is assigned to an individual identifier, wherein the user profile is determined in accordance with the configuration identifier;
generating a machine order to the drinks preparation machine, wherein the machine order specifies the preparation prescript.

The machine backend is typically a data processing system and includes memory means with computer program code means, which are stored therein and which describe a computer program, and data processing means for carrying out the computer program, wherein the execution of the computer program leads to the method according to the invention being carried out.

A method for the selection of a product, which is to be produced by a drinks preparation machine, the method being able to be carried out without a production of the product, includes the steps that are mentioned above as being carried out in the machine backend.

A corresponding computer program can be loaded and executed on a data processing unit and on its execution executes the method with the steps that are mentioned above as being carried out in the machine backend.

The computer program is typically loadable into an internal memory of a digital data processing unit and includes computer code means which, when they are executed in a digital data processing unit, bring this to execute the method according to the invention. In an embodiment of the invention, a computer program product includes a data carrier, or computer-readable medium, on which the computer program code means are stored.

Further preferred embodiments are to be derived from the dependent patent claims. Herein, the features of the method claims where appropriate can be combined with the device claims and vice versa.

BRIEF DESCRIPTION OF THE DRAWINGS

The subject-matter of the invention is explained hereinafter in more detail by way of preferred embodiment examples, which are represented in the accompanying drawings. In each case are shown schematically in:

FIG. 1 a structure of a system for producing a product with a drinks preparation machine, FIG. 2 alternative forms of a machine backend and a drinks preparation machine; and FIG. 3 a flow diagram of a method for the operation of the system.

DETAILED DESCRIPTION OF THE INVENTION

FIG. 1 schematically shows a structure of a system for producing a product by way of a drinks preparation machine amid the use of a system for voice input and voice output. The system includes a drinks preparation machine 1, a machine backend 2, a voice recognition backend 3 and a voice interface 4.

The drinks preparation machine 1 is designed for producing a drink, also called product, with one or more part-products, in accordance with preparation prescripts or recipes 14. The drinks preparation machine 1 includes means for data processing and for the communication with other devices, typically via a wire-connected or wireless computer network. The drinks preparation machine 1 includes a machine identifier 11 for the unambiguous identification, i.e. for differentiation from other drinks preparation machines. The drinks preparation machine 1 can receive or store preparation prescripts 14, on the basis of which the preparation of products can be controlled. Each of the preparation prescripts 14 is unambiguously determined by an identifier.

In the embodiments according to FIG. 1, preparation prescripts 14 and their assignment to an individual identifier 24 or to a generic identifier 34 are stored in the machine backend 2. The generic identifiers 34 are assigned to standard preparation prescripts 14 that are defined and unchanging for all users. In the figures, the generic indicators 34 are denoted in an abbreviated manner by x, y, z, w, v and in reality they are for example "ristretto", "espresso", "caffé" "caffé grande", "caffé cream", "caffé latte", "caffé cappuccino", "milk froth cold", "milk froth warm", etc. Additionally to this, generic identifiers 34 can be present for analogous names in other languages, in particular English.

The individual identifiers 24 are assigned to individual preparation prescripts 14 that can be adapted by the user. Herein, the individual preparation prescripts 14 can each be assigned to a user identifier 21 (as represented in the figure) and/or to a machine identifier 11 (not represented). In other words, the assignment between the individual identifiers 24 and the preparation prescripts 14 is user-dependent and can be stored in a user profile 26, identified by the user identifier 21. In the figures, the individual identifiers 24 are denoted in an abbreviated manner by a, b, c and in reality are, for example, "morning coffee", "favorite coffee" "pick-me-up", etc. Additionally to this, individual identifiers 24 can be present for analogous names in other languages, in particular English.

Personal identifiers 27 can likewise be stored as part of the user profile 26. These can be defined or processed by the user and the machine backend 2 in the same manner. They differ from the individual identifiers 24 in that their values have no equivalents in the voice recognition backend 3. In the figures, the personal identifiers 27 are denoted in abbreviated manner by m, n, o, p, q, but in reality they are, for example, "Karl's coffee", "Erich's Espresso", "Claudia's Cappuccino", etc.

The machine backend 2 can communicate with several drinks preparation machines 1 in a bi-directional manner via a communication connection.

The voice recognition backend 3 can communicate with the machine backend 2 in a bi-directional manner via a further communication connection. The voice recognition backend 3 includes a voice recognition system and a domain-specific subsystem ("skills"), which is directed towards recognising and processing specific commands for a certain field of application—in this case the activation of drinks preparation machines 1 of a certain manufacturer. As a result of the processing, the subsystem amongst other things can extract the identifiers 44, thus the generic identifiers 34 and the individual identifiers 24, from a spoken command.

The voice interface 4 includes a microphone, a loudspeaker and a data processing unit. It acquires acoustic signals and transmits them in digital form as an order voice file 42 to the voice recognition backend 3. Feedback voice files 33 from the voice recognition backend 3 are outputted by the loudspeaker as acoustic signals.

An example of a voice recognition backend 3 is the initially mentioned Echo system that is realised by Amazon and can be used by third-party providers. This includes an "Alexa-backend" for processing audio data of the Amazon Echo device as a voice interface 4, as well as a Lambda system for realising "skills" for third party providers. The Lambda system, on the basis of the processed audio files, can recognise an order to a drinks preparation machine 1, as well as a generic identifier 34, from a limited quantity of predefined generic identifiers 34 of the third-party provider. The Lambda system is architecture of Amazon, is carried out in the Amazon Cloud and realises functionalities that combine skills for a third-party provider with voice.

An assignment between the machine identifier 11, interface identifier 41 and user identifier 21 can be carried out in a registration procedure. Configuration information is defined herewith, and each of these identifiers can serve as a configuration identifier. Subsequently, an order that is received by the voice interface 4 can be assigned to a user and/or to a drinks preparation machine 1 on operation of the system. Herewith, local information can be determined concerning an order, such as assignment prescripts 25 (see below), individual identifiers 24 and preparation prescripts 14. Depending on how the system is operated, this local information is assigned to a user or a drinks preparation machine 1 and is determined via the user identifier 21 or the machine identifier 11.

In order to render an individual preparation prescript 14 accessible to the voice control, a user, for example via a configuration program that is carried out on an operating device, defines a preparation prescript 14 according to his own taste and assigns it to one of the predefined individual identifiers 24.

For example, as individual identifiers 24 there are available: "morning coffee", "favourite", "pick-me up" . . . . The assignment is realised by way of the user storing his preparation prescript, which he himself defines, under this name.

If the command "Alexa start Qbo and make me a pick-me-up" is now received and processed via the voice interface 4 and the voice recognition backend 3, then the individual identifier 24 denoted as "pick-me-up" is recognised and the personally defined preparation prescript 14 which is stored under the name "pick-me-up" is implemented.

If a voice command "Alexa, start Qbo and make me a ristretto" is received, then a generic identifier 34 exists for this and the generic defined preparation prescript 14 that is stored for this is carried out.

If a voice command "Alexa, start Qbo and make me Karl's coffee" is received, neither an individual identifier 24 nor a generic identifier 34 exists for this and the voice recognition backend 3 produces a feedback voice file 33 with a corresponding message to the user.

FIG. 2 shows an alternative embodiment of the machine backend 2. The individual identifiers 24 are not therein assigned to a preparation prescript 14 in a direct manner, but indirectly via an assignment prescript 25 and a personal identifier 27. A personal identifier 27, as in the embodiment of FIG. 1, can be defined by a user and assigned to a preparation prescript 14. This assignment and thus the preparation prescript 14 can be stored in the machine backend 2 or in the drinks preparation machine 1.

An assignment prescript 25 therefore assigns a personal identifier 27 to an individual identifier 24. In this embodiment, individual identifiers 24 are also common to all drinks preparation machines 1 and users. Personal identifiers 27 are each individually adaptable for a user and/or a drinks preparation machine 1.

In the example of FIG. 2, preparation prescripts 14 and assigned personal identifiers 27 are stored in the drinks preparation machine 1, and the assignment prescript 25 of individual identifiers 24 to the personal identifiers 27 is stored in the machine backend 2.

Assignment prescripts 25 can be assigned to individual users or user identifiers 21 in the machine backend 2. Assignment prescripts 25 for several users are then stored in the machine backend 2.

Alternatively, assignment prescripts 25 can also be assigned to drinks preparation machines 1. Assignment prescripts 25 for several drinks preparation machines 1 are then stored in the machine backend 2, wherein such an assignment prescript 25 is assigned to each of the drinks preparation machines 1 in a direct manner (for example, by the machine identifier 11 of the drinks preparation machine 1) or indirectly (for example, by a user identifier 21, which in turn is assigned to the machine identifier 11).

FIG. 3 shows a flow diagram of a method for operating the system for producing a product with a drinks preparation machine. The use cases that are mentioned therein are for example the preparation of a drink, the preparation of a drink at a certain time (specified in an absolute manner), the preparation of a drink after the completion of a certain time (specified in a relative manner), the enquiry concerning possibilities which are provided by the drinks preparation machine 1, etc. In the method, the following steps can be carried out.

A. In the voice interface 4, for example an Alexa or Echo device:
   a. Recognises the voice of the user, decodes the voice message "Alexa <X>" and sends <X> as an order voice file 42 to the voice recognition backend 3.

B. Voice recognition backend 3, for example Alexa B backend of Amazon:
   a. Receives the order voice file 42 with raw sound files and decodes the sound files into written language.
   b. If the command is directed to a certain infrastructure for the drinks preparation machines 1, for example according to a "skill" which is defined in Amazon Alexa, with the command "Alexa start Qbo and <Y>", then <Y> is sent to the Lambda system for Qbo.

C. Voice recognition backend 3, for example Lambda system of Amazon:
   a. Recognises for example in the order "Alexa, start Qbo and brew me an espresso", that the term "espresso" is a fixed variable corresponding to a generic identifier 34 for a standard preparation prescript of Qbo.
   b. Extracts all variables (generic identifier 34, time details, use case, . . . ) and sends these to the machine backend 2 as a backend order 32.

D. Machine backend 2:
   a. Runs on servers of a third-party provider.
   b. Receives the backend order 32: machine A via use case B would now like to have the variable C. For example, if A is a certain machine identifier (which means that an assignment between the interface identifier 41 and the machine identifier 11 has been carried out on the basis of configuration information in the voice recognition backend 3), then the use case is "produce drink" and C is an identifier 44, thus an individual identifier 24 or a generic identifier 34.
   c. Keeps ready preparation prescripts 14 for the individual identifiers 24 and generic identifiers 34.
   d. Maintains contact with all machines and depending on the use case sends the identified preparation prescript 14 to a machine as part of a machine order 22.

E. Drinks preparation machine 1:
  a. Keeps active a connection to the machine backend 2.
  b. For reasons of security, the drinks preparation machine 1 builds up the connection and pulls recipes which are geared towards it, from the machine backend 2 by the pull mechanism (no push is possible).
  c. It activates the brewing depending on the use case.
  d. If the brewing can be activated, then it can transfer a confirmation to the voice recognition backend as a machine feedback 13. Otherwise, e.g. if water is absent, it can transfer an error message as a machine feedback 13.
F. Machine backend 2:
  a. Receives the feedback and forwards this to the Lambda system of the voice recognition backend 3 as a backend feedback 23.
G. Voice recognition backend 3, Lambda system:
  a. Receives the feedback and processes it according to the use case.
  b. Decides which response is given.
  c. Sends the response to the Alexa backend.
H. Voice recognition backend 3, Alexa backend:
  a. Receives the response and converts this into a voice file.
  b. Transfers the voice message to voice interface 4 as a feedback voice file 33.
I. Voice interface 4, Alexa device:
  a. Reproduces the feedback voice file 33.

A control unit of the drinks preparation machine 1 includes a memory, in which amongst other things preparation prescripts or recipes are stored. A preparation prescript includes at least control information that can be converted into commands for the control of the drinks preparation machine 1. Such control information on the one hand includes sequence information that specifies a sequence of steps that are to be carried out by the drinks preparation machine 1 for producing a total product. On the other hand, the control information includes, for example, temperatures, volume details, time details, etc.—hereinafter generally also called preparation parameters—which parameterise a sequence.

Sequence information represents, for example, "switch on the heating of the supplementary unit; switch on the pump of the brewing module for fifteen seconds; wait for at least five seconds after switching off the pump until the heating is at the desired temperature; switch on the milk pump for twelve seconds". The times and temperatures that are mentioned in this example can be specified by preparation parameters and/or be determined by the control in accordance with other preparation parameters and measured values of sensors.

A preparation prescript can also include user instructions. These instructions are part of the preparation of the total product and must be carried out by a user. For this, the user instructions can be displayed by way of an output unit of the drinks preparation machine or a user interface of a separate operating device (for example, of a smartphone). For example, such user instructions are "now add ice cubes" or "please measure 20 ml of caramel syrup" or "now add the prepared caramel syrup" or "please stir" or "please examine whether the inserted capsule and selected recipe match" etc. A user instruction can be accompanied by a visual representation, for example of the total product to be created, of a selected or actually inserted capsule etc.

For preparing a product, control information or corresponding commands are implemented by the drinks preparation machine 1 in accordance with the preparation prescript and a preparation sequence is realised by this. If the preparation prescript includes user instructions, then these are displayed to the user at corresponding locations of the sequence. The subsequent control information of the preparation sequence is implemented after an acknowledgement by the user by way of an input unit of the drinks preparation machine or the user interface, said acknowledgement confirming the implementation of the user instruction to the system.

A preparation prescript can include preparation parameters that are permitted to be adapted by the user, as well as preparation parameters that cannot be adapted by the user. Adaptable preparation parameters, for example, are (volume) shares of part-products in the total product, a total quantity, or the temperature of a part-product. For adaptable preparation parameters, the preparation prescript can include a standard value or default value that is used if the user does not adapt the parameter.

The invention claimed is:

1. A method for producing a product using a drinks preparation machine, comprising the steps of:
  by a machine backend for the drinks preparation machine, receiving a backend order, wherein the backend order comprises an identifier for identification of a preparation prescript, as well as a configuration identifier;
    determining from the identifier whether the backend order comprises a generic identifier or an individual identifier;
  determining the preparation prescript by determining,
    if the identifier is an individual identifier, the preparation prescript which, in a specific user profile that is one of a plurality of user profiles, is assigned to the individual identifier, wherein the specific user profile is determined in accordance with the configuration identifier;
    if the identifier is a generic identifier, the preparation prescript is assigned to the generic identifier, wherein the assignment is independent of the specific user profile:
  by the machine backend, generating a machine order directed to the drinks preparation machine, wherein the machine order specifies the preparation prescript;
  by the drinks preparation machine, producing the product in accordance with the preparation prescript;
the method further comprising
  by a voice interface and a voice recognition backend, acquiring a voice input and generating, in accordance with the voice input, the backend order directed to the machine backend for the drinks preparation machine, wherein only individual identifiers are processed by the voice interface which are predefined and/or stored in the machine backend; and
wherein, if the identifier is said individual identifier, the preparation prescript is associated to the identifier based on a personal identifier, the personal identifier being provided in the specific user profile, and the configuration identifier which identifies the voice interface, the drinks preparation machine, and the user profile.

2. The method according to claim 1, wherein the machine order specifies the preparation prescript in accordance with the individual identifier or the generic identifier, in that the machine order comprises the specified preparation prescript.

3. The method according to claim 1, wherein the machine order specifies the preparation prescript in accordance with the individual identifier or the generic identifier, in that the machine order comprises the individual identifier or the generic identifier.

4. The method according to claim 1, wherein the configuration identifier is one or more of the following:
a machine identifier identifying the drinks preparation machine;
an interface identifier identifying the voice interface;
a user identifier identifying the user profile.

5. The method according to claim 1, wherein a transfer of the machine order directed to the drinks preparation machine is effected using a pull method whereby the drinks preparation machine enquires at the machine backend as to whether a machine order is present and, given the presence of the machine order, activates transfer of the machine order to the drinks preparation machine.

6. The method according to claim 1, comprising the further steps of:
by the drinks preparation machine, generating a machine feedback for the machine backend;
by the machine backend, generating a corresponding backend feedback for the voice interface;
by the voice interface, outputting a voice message in accordance with the backend feedback.

7. A system comprising a drinks preparation machine and a machine backend, wherein the system is configured for carrying out a method for producing a product using the drinks preparation machine, comprising the steps of:
by a machine backend for the drinks preparation machine, receiving a backend order, wherein the backend order comprises an identifier for identification of a preparation prescript, as well as a configuration identifier;
determining from the identifier whether the backend order comprises a generic identifier or an individual identifier;
determining the preparation prescript by determining,
if the identifier is an individual identifier, a preparation prescript which, in a specific user profile that is one of a plurality of user profiles, is assigned to the individual identifier, wherein the specific user profile is determined in accordance with the configuration identifier;
if the identifier is a generic identifier, the preparation prescript is assigned to the generic identifier, wherein the assignment is independent of the specific user profile:
by the machine backend, generating a machine order directed to the drinks preparation machine, wherein the machine order specifies the preparation prescript;
by the drinks preparation machine, producing the product in accordance with the preparation prescript;
the method further comprising
by a voice interface and a voice recognition backend, acquiring a voice input and generating, in accordance with the voice input, the backend order directed to the machine backend for the drinks preparation machine, wherein only individual identifiers are processed by the voice interface which are predefined and/or stored in the machine backend; and
wherein, if the identifier is said individual identifier, the preparation prescript is associated to the identifier based on a personal identifier, the personal identifier being provided in the specific user profile, and the configuration identifier which identifies the voice interface, the drinks preparation machine, and the user profile.

8. A machine backend for a drinks preparation machine, comprising a data processing system comprising a memory, a computer program stored in the memory, and a data processor for executing the computer code, wherein execution of the computer program includes the following steps:
receiving a backend order, wherein the backend order comprises an identifier for the identification of a preparation prescript, as well as a configuration identifier;
determining from the identifier whether the backend order comprises a generic identifier or an individual identifier;
determining the preparation prescript by determining:
if the identifier is an individual identifier, the preparation prescript that, in a user profile is assigned to an individual identifier, wherein the user profile is determined in accordance with the configuration identifier;
if the identifier is a generic identifier, the preparation prescript which is assigned to the generic identifier, wherein the assignment is independent of the user profile;
generating a machine order directed to the drinks preparation machine, wherein the machine order specifies the preparation prescript; and
wherein the preparation prescript is associated to an individual identifier based on a personal identifier, the personal identifier being provided in the specific user profile, and the configuration identifier which identifies the voice interface, the drinks preparation machine, and the user profile.

\* \* \* \* \*